T. New,
Water Proof Cellar.
No. 113,328.   Patented Apr. 4, 1871.
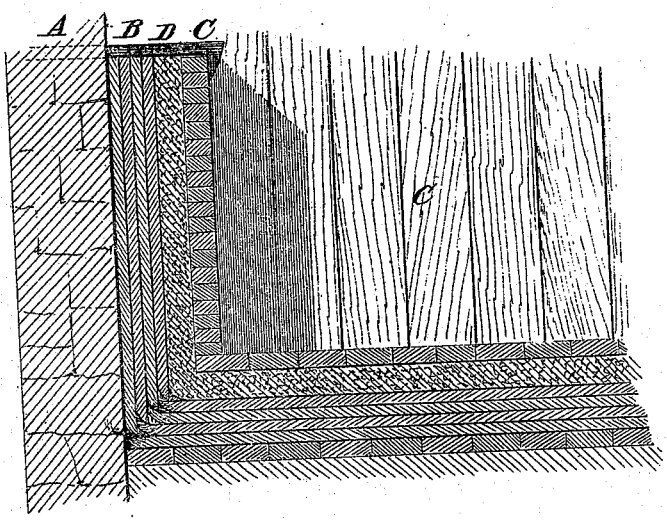

UNITED STATES PATENT OFFICE.

TOBIAS NEW, OF BROOKLYN, NEW YORK.

IMPROVEMENT IN WATER-PROOF CELLARS.

Specification forming part of Letters Patent No. 113,328, dated April 4, 1871.

*To all whom it may concern:*

Be it known that I, TOBIAS NEW, of Brooklyn, in the county of Kings and State of New York, have invented a new and useful Improvement in Constructing Water-Proof Cellars, Cisterns, &c; and I do hereby declare that the following is a full, clear, and exact description thereof, which will enable others skilled in the art to make and use the same, reference being had to the accompanying drawing, forming part of this specification.

This invention relates to a new and useful improvement in the construction of water-proof cellars, cisterns, vaults, and all underground apartments for whatever purpose, whereby the bottom and walls of such cellars, &c., are made perfectly impervious to water; and the invention consists in the use of successive layers of roofing-felt and asphaltic or roofing cement, applied as hereinafter more fully described.

The accompanying drawing is a vertical section of a cellar with the bottom and walls constructed according to my invention.

A represents a cellar-wall, on the inner side of which I commence to place my water-proof layers of cement and felting. B represents the felting. C represents an inner wall of brick, stone, or wood, sufficiently strong and substantial to withstand any expected pressure of water from without. D is a layer of hydraulic concrete between the asphaltic-cement layers and the inner wall, C. This layer of hydraulic cement may or may not be employed, as may be deemed advisable.

In carrying out my invention I commence with the bottom, which I prepare by smoothing it off and making a tolerably even surface by means of concrete or otherwise, and then apply alternate layers of asphaltic or roofing cement and roofing-felt or equivalent material. In this manner I apply four layers, more or less.

To enable the bottom thus formed to withstand the upward pressure of water, I weigh down or ballast the bottom in any convenient manner.

The walls of the cellar, cistern, vault, &c., I construct in a similar manner.

The surface, whether of stone or other material, having been made sufficiently even, the cement is first applied, and then successive layers of felt and cement, with the inner wall or bulwark of stone, brick, or wood, which inner wall is placed directly against said layers of felt and cement, and anchored to the outer wall at the top, and either with or without the intervening layers of hydraulic concrete, as may be deemed best. At the angles or corners of the cellar or cistern the layers of felt on the bottom and on the sides may lap past each other, if desired, so that the wall and the bottom may be firmly united, and a tight and water-proof joint be insured in every part.

By this mode of construction, cellars, &c., beneath tide-water, as well as in other locations, may be made perfectly water-tight, as well as cisterns and reservoirs.

Having thus described my invention, I claim as new and desire to secure by Letters Patent—

A solid foundation formed of concrete or wood, a layer of asphaltic cement, several layers of roofing-felt, a layer of concrete or stone of sufficient weight to counterbalance the upward pressure of water, and a layer of brick to form the floor, all arranged successively from the bottom upward, as and for the purpose specified.

TOBIAS NEW.

Witnesses:
GEO. W. MABEE,
T. B. MOSHER.